US011019478B2

(12) United States Patent
Berggren et al.

(10) Patent No.: US 11,019,478 B2
(45) Date of Patent: May 25, 2021

(54) METHOD FOR COUNTING USER EQUIPMENT IN A RADIO NETWORK

(71) Applicants: SONY MOBILE COMMUNICATIONS INC, Tokyo (JP); SONY CORPORATION, Tokyo (JP)

(72) Inventors: Anders Berggren, Lund (SE); Basuki Priyanto, Lund (SE); Shin Horng Wong, Weybridge (GB); Brian Martin, Waybridge (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/622,261

(22) PCT Filed: Jun. 7, 2018

(86) PCT No.: PCT/SE2018/050590
§ 371 (c)(1),
(2) Date: Dec. 12, 2019

(87) PCT Pub. No.: WO2019/009777
PCT Pub. Date: Jan. 10, 2019

(65) Prior Publication Data
US 2020/0107180 A1    Apr. 2, 2020

(30) Foreign Application Priority Data
Jul. 7, 2017    (SE) .................. 1750900-1

(51) Int. Cl.
*H04W 28/22*    (2009.01)
*H04W 74/00*    (2009.01)
(Continued)

(52) U.S. Cl.
CPC ........... *H04W 8/005* (2013.01); *H04W 24/08* (2013.01); *H04W 24/10* (2013.01);
(Continued)

(58) Field of Classification Search
CPC ..... H04W 28/02; H04W 74/00; H04W 48/06; H04W 4/02; H04W 52/0216;
(Continued)

(56) References Cited

U.S. PATENT DOCUMENTS

| 7,120,455 B1 * | 10/2006 | Chen | H04L 51/04 |
| | | | 455/466 |
| 7,343,167 B2 * | 3/2008 | Kang | H04W 52/287 |
| | | | 455/458 |

(Continued)

FOREIGN PATENT DOCUMENTS

| WO | 2010121398 A1 | 10/2010 |
| WO | WO2020064615 A1 * | 9/2019 |
| WO | WO 2002/200446 A1 * | 8/2020 |

OTHER PUBLICATIONS

A Tutorial on Performance Evaluation and Validation Methodology for Low-Power and Lossy Networks by Kosmas Kritsis, et al Published in: IEEE Communications Surveys & Tutorials (vol. 20, Issue: 3, thirdquarter2018) Mar. 2018 (Year: 2018).*

(Continued)

*Primary Examiner* — William D Cumming
(74) *Attorney, Agent, or Firm* — Tucker Ellis LLP

(57) ABSTRACT

Method for providing a count indication of radio devices to a radio network, particularly in idle or in-active mode, comprising transmitting a presence message to a first base station of the radio network based on a reporting rule, which presence message indicates presence of a radio device within a dedicated coverage area of the radio network. The reporting rule may include a probability rule, wherein said presence message is transmitted from the radio device responsive to an outcome of a probability check, based on the probability rule, indicating that the radio device shall transmit the presence message. The reporting rule may also be transmitted responsive to the radio device making a cell (Continued)

reselection to the first cell. After receiving an acknowledgement presence message from the base station, connection setup to the network is terminated.

20 Claims, 3 Drawing Sheets

(51) Int. Cl.
| | |
|---|---|
| *H04W 68/00* | (2009.01) |
| *H04W 8/00* | (2009.01) |
| *H04W 76/10* | (2018.01) |
| *H04W 24/08* | (2009.01) |
| *H04W 24/10* | (2009.01) |
| *H04W 72/08* | (2009.01) |
| *H04W 4/70* | (2018.01) |
| *H04W 74/08* | (2009.01) |

(52) U.S. Cl.
CPC ......... *H04W 72/085* (2013.01); *H04W 76/10* (2018.02); *H04W 4/70* (2018.02); *H04W 74/0833* (2013.01)

(58) Field of Classification Search
CPC . H04W 58/00; H04W 36/0011; H04W 68/00; H04W 28/22; H04W 52/287
USPC ....... 455/3.01, 515, 458, 436, 466; 370/312, 370/329, 252, 270, 351, 311
See application file for complete search history.

(56) References Cited

U.S. PATENT DOCUMENTS

| | | | | | |
|---|---|---|---|---|---|
| 7,505,776 | B2* | 3/2009 | Ryu | ...................... | H04W 68/02 455/458 |
| 7,548,756 | B2* | 6/2009 | Velthuis | .................. | H04L 51/04 455/414.1 |
| 7,885,224 | B2* | 2/2011 | Ryu | ................. | H04W 36/0011 370/328 |
| 7,986,633 | B2* | 7/2011 | Ryu | ...................... | H04W 76/40 370/252 |
| 8,335,518 | B2* | 12/2012 | Park | ..................... | H04W 60/04 455/456.1 |
| 8,699,412 | B2* | 4/2014 | Amerga | ................ | H04W 48/16 370/328 |
| 8,891,427 | B2* | 11/2014 | Dong | .................... | H04L 12/189 370/312 |
| 9,288,076 | B2* | 3/2016 | Klug | ....................... | H04L 67/24 |
| 9,596,042 | B2* | 3/2017 | Siomina | ............... | H04B 17/345 |
| 9,992,802 | B2* | 6/2018 | Lee | .................... | H04W 52/0216 |
| 10,531,326 | B2* | 1/2020 | Hong | .................... | H04W 24/10 |
| 10,764,798 | B2* | 9/2020 | Ahmavaara | ....... | H04W 36/0088 |
| 2005/0193140 | A1* | 9/2005 | Tiedemann, Jr. | ...... | H04W 28/22 709/232 |
| 2005/0281209 | A1* | 12/2005 | Cai | ....................... | H04W 74/00 370/270 |
| 2006/0009242 | A1* | 1/2006 | Ryu | ...................... | H04W 68/02 455/458 |
| 2006/0089166 | A1* | 4/2006 | Nagano | ................. | H04W 48/06 455/515 |
| 2006/0194581 | A1* | 8/2006 | Kang | .................... | H04W 68/00 455/436 |
| 2006/0271661 | A1* | 11/2006 | Qi | ......................... | H04L 67/125 709/223 |
| 2006/0271696 | A1* | 11/2006 | Chen | ....................... | H04L 51/04 709/229 |
| 2007/0002824 | A1* | 1/2007 | Klug | ....................... | H04L 67/24 370/351 |
| 2007/0236719 | A1* | 10/2007 | Chandranmenon | ..... | H04L 67/38 358/1.14 |
| 2008/0004044 | A1* | 1/2008 | Simpson | ........... | H04W 52/0216 455/458 |
| 2008/0013462 | A1* | 1/2008 | Ye | ..................... | H04L 12/40032 370/252 |
| 2008/0095088 | A1* | 4/2008 | Ryu | ................. | H04W 36/0011 370/311 |
| 2008/0219210 | A1* | 9/2008 | Shuey | ................... | G01D 4/006 370/329 |
| 2009/0080351 | A1* | 3/2009 | Ryu | ...................... | H04L 1/0003 370/312 |
| 2010/0035633 | A1* | 2/2010 | Park | ...................... | H04W 60/04 455/456.1 |
| 2010/0135251 | A1* | 6/2010 | Sambhwani | ............ | H04W 8/26 370/331 |
| 2010/0172297 | A1* | 7/2010 | Amerga | ................ | H04W 48/16 370/328 |
| 2011/0319011 | A1* | 12/2011 | Dong | .................... | H04L 12/189 455/3.01 |
| 2013/0295943 | A1* | 11/2013 | Pasumarthi | ....... | H04W 72/0446 455/450 |
| 2016/0036541 | A1* | 2/2016 | Siomina | ............... | H04B 17/345 455/422.1 |
| 2016/0135231 | A1* | 5/2016 | Lee | ....................... | H04W 48/18 370/329 |
| 2016/0197864 | A1* | 7/2016 | Klug | ...................... | H04L 51/043 709/206 |
| 2017/0156110 | A1* | 6/2017 | Ueno | .................. | H04N 1/32507 |
| 2018/0139666 | A1* | 5/2018 | Ahmavaara | ....... | H04W 36/0094 |
| 2019/0037425 | A1* | 1/2019 | Hong | .................. | H04W 72/042 |
| 2020/0107180 | A1* | 4/2020 | Berggren | ............ | H04W 72/085 |

OTHER PUBLICATIONS

International Search Report and Written Opinion from corresponding International Patent Application No. PCT/SE2018I050590, dated Aug. 28, 2018, 7 pages.

\* cited by examiner

METHOD FOR COUNTING USER EQUIPMENT IN A RADIO NETWORK

TECHNICAL FIELD

This disclosure relates to methods for load management in wireless communication systems, where a number of radio devices are present within a dedicated coverage area operated by means of a radio network including base stations.

BACKGROUND

Wireless communication systems are widely deployed to provide various telecommunication services such as telephony, video, data, messaging, and broadcasts. In this respect, a wireless communication system may be operated by means of a radio network, comprising a number of radio base stations connected to a backbone, which in turn is connected to the Internet and other networks. Wireless radio devices, normally referred to as user equipment, may gain contact with the radio network by means of radio communication with the base stations. The wireless communication systems are mainly developed for the purpose of providing communication possibilities to mobile devices, but it should be noted that a user equipment may be substantially or completely stationary, and still benefit from being provided with radio communication capabilities.

Various multiple access technologies have been adopted in different telecommunication standards to provide a common protocol that enables different wireless devices to communicate on a municipal, national, regional and global level. An example is Long Term Evolution (LTE). LTE is a set of enhancements to the Universal Mobile Telecommunications System (UMTS) mobile standard promulgated by Third Generation Partnership Project (3GPP). Further telecommunication standards have been developed in the past and more will follow, as this is an area of constant development.

The demand for wireless communication access continues to increase. This includes a need for mobile broadband access by an increasing number of devices. In parallel, various technical improvements have been made for providing wireless access to various types of user equipment with comparatively lower requirements on bandwidth and data rates. This includes radio devices of less complex structure that e.g. may need to transmit or receive data with long intervals. For such purposes, technical specifications for e.g. machine-type communication MTC and narrowband Internet of things Nb-IoT are developed within 3GPP. Devices that may employ such communication schemes may include meters, monitoring devices and other type of equipment, which may be of low cost and require little or no recharging of battery. While the number of wireless devices in use, such as mobile phones and tablets, continues to increase, it is foreseen that the amount of IoT devices having access to communicate over wireless communication systems will grow even more rapidly and extensively. Even though most user equipment present within a coverage area of a radio network will normally not be active simultaneously, the sheer number of such devices provides a challenge. Should a large number of devices need access to the network at a common instance, the load on physical access request channels need to be handled.

SUMMARY

There is consequently a need in the art to provide a solution associated with load management in wireless communication systems, in view of the increase in use of user equipment. One method of targeting this problem is to provide a solution for allowing the radio network to establish a count measure of user equipment present within a dedicated coverage area.

According to a first aspect, a method for establishing a count measure of radio devices in a radio network is provided, comprising receiving a presence message at a first base station of the radio network, wherein said presence message is transmitted based on a predefined reporting rule;

detecting presence of a radio device within a dedicated coverage area of the radio network responsive to receiving said presence message.

In one embodiment, the method comprises compiling the count measure in which the detected presence represents a count of at least one radio device.

In one embodiment, said presence message is received responsive to conditional transmission of the presence message, based on an outcome of a probability check according to a probability rule, said outcome indicating whether the radio device shall transmit the presence message.

In one embodiment, the method comprises sending probability level data from the network, for use in the radio device in said probability check.

In one embodiment, said probability level data is broadcast as system information from the network.

In one embodiment, said reporting rule includes an instruction to transmit a presence message from a radio device responsive to the radio device entering said coverage area.

In one embodiment, said reporting rule includes an indication of a delay to apply prior to transmitting the presence message from the radio device.

In one embodiment, said reporting rule includes an indication of a time window, within which to randomly calculate the delay.

In one embodiment, the method comprises the step of
sending trigger information from the radio network, wherein said reporting rule includes an instruction to transmit a presence message from a radio device dependent on the trigger information.

In one embodiment, said trigger information is broadcast as system information from the network.

In one embodiment, the method comprises the step of paging the radio device to detect said trigger information in the broadcast system information.

In one embodiment, said presence message is conveyed in a radio signal received from said radio device.

In one embodiment, said presence message is received prior to or without receiving a connection setup request message from the radio device.

In one embodiment, said coverage area is a first cell served by said first base station.

In one embodiment, the presence message is received responsive to the radio device making a cell reselection to the first cell.

In one embodiment, the presence message is received from a previous base station serving a previous cell, responsive to the radio device making a cell reselection to the first cell from the previous cell.

In one embodiment, the method comprises the step of
receiving, in association with the presence message, an indication of a previous cell from which the radio device made the cell reselection.

In one embodiment, the method comprises the step of receiving, in association with the presence message, an indication of a latest cell in which presence of the radio device was detected.

According to a second aspect, a method is disclosed for providing a count indication of radio devices to a radio network, comprising transmitting a presence message to a first base station of the radio network based on a predefined reporting rule, which presence message indicates presence of a radio device within a dedicated coverage area of the radio network.

In one embodiment, said reporting rule includes a probability rule, wherein said presence message is transmitted from the radio device responsive to an outcome of a probability check, based on the probability rule, indicating that the radio device shall transmit the presence message.

In one embodiment, the method comprises the step of receiving probability level data from the network in the radio device for use in said probability check.

In one embodiment, said probability level data is received as system information broadcast from the network.

In one embodiment, the method comprises the step of transmitting the presence message from the radio device responsive to the radio device entering said coverage area, based on a transmit instruction of said reporting rule.

In one embodiment, the method comprises the step of applying a delay to prior to transmitting the presence message.

In one embodiment, the method comprises the step of randomly calculating said delay within a time window according to said reporting rule.

In one embodiment, the method comprises the step of receiving trigger information in the radio device from the radio network, wherein said reporting rule includes an instruction to transmit a presence message from a radio device dependent on the trigger information.

In one embodiment, said trigger information is received as system information broadcast from the network.

In one embodiment, said trigger information is received in a page from the radio network.

In one embodiment, said presence message is conveyed in a radio signal received from said radio device.

In one embodiment, said presence message is transmitted prior to or without transmitting a connection setup request message from the radio device.

In one embodiment, the method comprises the steps of the radio device transmitting said presence message on a random access channel to the base station;
receiving an acknowledgement presence message from the base station;
terminating connection setup.

In one embodiment, the radio device transmits the presence message while in an idle or in-active mode.

In one embodiment, said coverage area is a first cell served by said first base station.

In one embodiment, the presence message is transmitted responsive to the radio device making a cell reselection to the first cell.

In one embodiment, the presence message is transmitted from a second base station serving a second cell, responsive to the radio device making a cell reselection to the first cell from the second cell.

In one embodiment, the method comprises the step of transmitting, in association with the presence message, an indication of a previous cell from which the radio device made the cell reselection.

In one embodiment, the method comprises the step of transmitting, in association with the presence message, an indication of a latest cell in which a presence message was transmitted.

DETAILED DESCRIPTION

Figure 1:
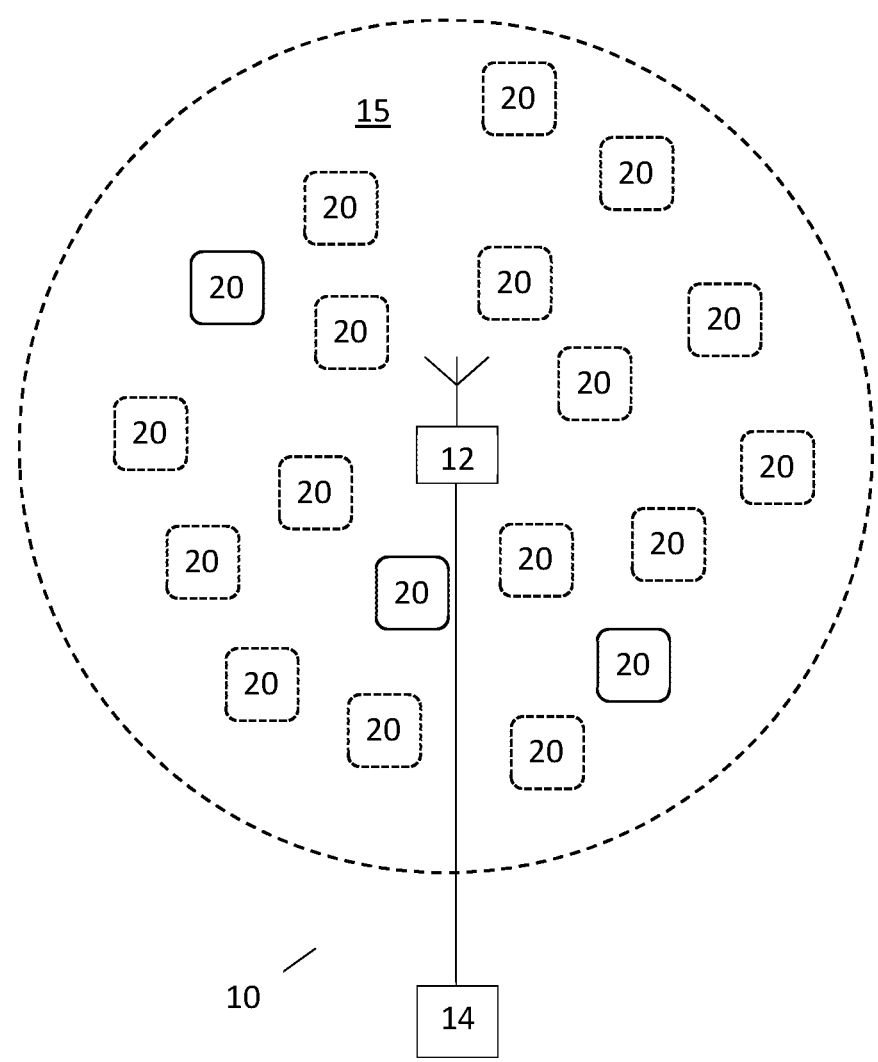
FIG. 1 schematically illustrates a coverage area of radio network and a plurality of radio devices present within the coverage area.

The detailed description set forth below, wherein reference is made to the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the embodiments presented herein are disclosed with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software in any such form may be stored in a memory, such as a non-volatile memory, forming part of or being connected to the processing system.

Machine-to-Machine (M2M) communications often refers to technologies that allow devices to communicate with each other, with little human intervention. Such M2M communication devices typically may store data, and may transmit data to other M2M devices or to a server over a network, such as a cellular network. In the 3rd Generation Partnership Project (3GPP) Long Term Evolution (LTE) and its evolution LTE-Advanced (LTE-A), one version of M2M has been developed under the term Machine Type Communications (MTC). An MTC device may perform automatic data transmissions in a network wherein each data transmission can be initiated by a first machine, routed through a network, and delivered to one or more other machines. When operating under a 3GPP system, such as an LTE system, scheduling of resources for such communication is controlled by the network, typically within the base station, or the eNode B (eNB) as denoted in LTE. In addition to legacy LTE control and data communication and MTC, another system that can co-exist is the in-band deployment of a Narrow-Band Internet of Things (NB-IoT) system, which may optionally also be deployed in the guard-band or in stand-alone mode. Operating under such a protocol, an NB-IoT carrier of ~200 kHz can be located within the assigned bandwidth of LTE operation.

In the following, the detailed description describes example embodiments of the present invention in relation to radio wide area networks of a wireless communication system, but it may be noted that the invention is not limited thereto and can be applied to other types of wireless networks where similar advantages can be obtained. Furthermore, description will be given associated with embodiments related to MTC or NB-IoT under LTE, where a radio device is commonly referred to as a user equipment (UE), but the invention is applicable also to other types of radio systems, and may also include coming systems such as discussed under the concept of NR (New Radio), or other wireless communication systems and networks.

In a wireless system where a very large number of radio devices may be present at any time within a dedicated coverage area, a situation may occur that a multitude of radio device request access simultaneously. This is a potential risk that may increase dramatically with the introduction of large volumes of M2M devices. For NR, discussions related to Random access have started, including enhancements for NR compared to legacy LTE, including handling the PRACH load, and potential overload. The problem is e.g. to handle excessive amount of RACH attempts, and especially Re-attempts. This could also involve UEs in Coverage Enhancement mode (CE). So, in order for the network or base station to handle a certain RACH load, and to dimension its PRACH resources, an understanding of the number of UEs that might access the base station may be beneficial. In this context, a dedicated coverage area may be a cell, as served by a base station of a radio network. In another embodiment, the dedicated area may refer to a larger area comprising a plurality of cells, such as a RAN area. In the endeavor of finding a procedure for managing the risk of a surge in access requests, it is proposed that a method for UE counting is employed. The objective is that the radio network shall gain knowledge of at least an estimate of the number of UEs present within the dedicated coverage area. A serving base station should already know how many active UEs that are connected to the base station. However, for idle mode, or inactive UEs under NR, this would not be possible without some sort of update procedure since there is no RRC connection between the radio device and the base station. Although the radio device in such modes may be configured to make cell reselections and to listen to signaling from the base stations of network, e.g. listen to broadcast messages and monitor paging signals from the network, the radio transmitter in the radio devices are inactive and the base stations of the network are not aware of which base station the radio devices are camped to or moving towards.

FIG. 1 schematically illustrates a radio network 10, comprising at least one base station 12 connected to a backbone 14 of a wireless communication system. The radio network comprises one or more dedicated coverage areas 15. As an example, each base station may be configured to cover an area 15 associated with one cell of the radio network, as indicated in FIG. 1. In other embodiments, the dedicated coverage area may be a RAN area, incorporating a large number of cells 15. The base station 12 may be configured to serve a plurality of radio devices 20 within the coverage area of a cell 15. Some radio devices may be connected, or active, and are indicated by full line contours in FIG. 1. For such radio devices 20, it will be clear to the network 10, from information gathered from the base station 12, how many radio devices are present within the coverage area 15. Concurrently, a number of radio devices 20 may be present within the coverage area 15 in idle or inactive mode, indicated in FIG. 1 by means of a dashed contour. These may be completely or substantially stationary, or mobile radio devices. It will therefore not be clear to the network 10 how many such radio devices are present within the coverage area 15. This also means that the network 14 may not be appropriately prepared to handle access attempt load control, especially if a large number of the radio devices 20 should make an access attempt concurrently.

Figure 3:
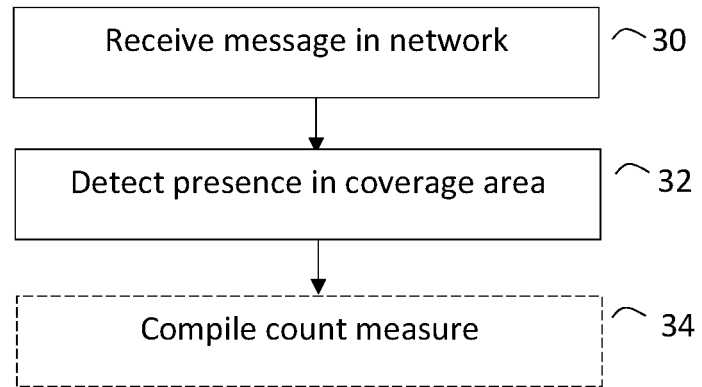
FIG. 3 outlines steps carried out by the network in communication with a radio device in a method according to an embodiment.

For this reason, a solution is proposed as broadly indicated in FIG. 3. This relates to a method for establishing a count measure of radio devices 20 in a radio network 10, such as a value representing the number of a radio devices 20 present within a certain coverage area. The method comprising a step 30 of receiving a presence message at a first base station 12 of the radio network, wherein said presence message is transmitted based on a reporting rule; and 32 detecting presence of a radio device 20 within a dedicated coverage area 15 of the radio network 10 responsive to receiving said presence message. This presence message may be used in a step 34 for compiling the count measure, in which the received presence message represents a count of at least one radio device 20. In this context, the network 10 may compile a count measure of how many radio devices 20 are present in a dedicated coverage area 15. As will be discussed below, the method may involve counting all radio devices for which a message is received, and adding up the number of such detected radio devices 20. In various embodiments, not all radio devices 20 are configured to transmit a presence message, and the count measure may involve calculating an estimate of the number of radio devices 20 present, based on the number detected radio devices.

In various embodiments, only radio devices 20 of one or more predefined radio access technologies (RAT) are configured to or triggered to report a presence message. In one embodiment, only Nb-IoT radio devices 20 are configured to transmit a presence message. In one embodiment, MTC radio devices 20 are configured to transmit a presence message. In another embodiment, radio devices 20 of any RAT supported in the coverage area, e.g. LTE, MTC, NbIoT, may be configured to transmit a presence message, but only a subset of those will be triggered to do so, e.g. by a setting in broadcast system information. It thus be understood that where a radio device 20 is described herein e.g. as being configured to send a presence message, this may in various embodiments relate to a radio device with a specific RAT capability.

In an embodiment where the dedicated coverage area is a cell, at least idle mode radio devices 20 are configured to send this presence message. One reason for the network 10, or specifically the base station 12, to know the number of Idle mode radio devices may be for PRACH (Physical Random Access Channel) resource handling. If there are many Idle mode radio devices 20 in the cell 15 and they would try to access the network 10 simultaneously, a PRACH storm, i.e., a congestion situation and overload situation may result. In one embodiment, also connected mode radio devices 20 are configured to send this presence message, e.g. for the sake of facilitating the step of compiling the count measure in step 34, but strictly speaking that would not be required in order for the network to know how many connected radio devices 20 are present.

In one embodiment, where the dedicated coverage area 15 is a RAN area comprising a number of cells, at least radio devices 20 in Light Connected state, as identified in NR, or otherwise inactive state, are configured to send this presence message, but potentially also connected radio devices 20. If the UE is in Light Connected or in Inactive state, a RAN Area Update could be triggered for every cell change, or for relevant cells, within the dedicated RAN area 15.

In yet another embodiment, the network 10 or the base station 12 may be configured to compile a measure of how many radio devices 20 in Idle mode there are in the coverage area 15 that benefit from Coverage Enhancement (CE). In such an embodiment, a presence message may be configured to be transmitted for receipt in the network 10, specifically associated with such CE radio devices 20.

Figure 4:
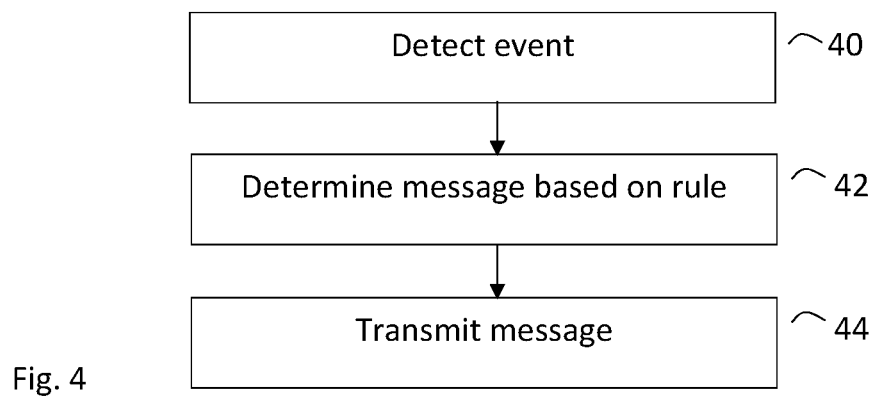
FIG. 4 outlines steps carried out by a radio device in communication with the network in a method according to an embodiment.

Various embodiments will now be described, primarily from the viewpoint of the radio device 20 or other sender node, and will broadly fall within the scope of FIG. 4. Herein, a method is shown for providing a count indication of radio devices 20 to a radio network 10, comprising 44 transmitting a presence message to a first base station 12 of the radio network 10 based on a reporting rule 42, which presence message indicates presence of a radio device 20 within a dedicated coverage area 15 of the radio network 10. In one embodiment, the transmission of the presence message it preceded by an event, wherein detection 40 of the event may at least partly be configured to cause the transmission of the presence message.

In one embodiment, a method is proposed based on the notion that it may be sufficient for the network 10, or specifically the base station 12, to establish a count measure that represents an estimate of the number of radio devices 20 present within the coverage area 15. The step 44 of transmitting the presence message will occupy some portion of the air interface, and there may thus be reasons for minimizing this type of transmission, especially considering that the number of idle mode radio devices may be very large. Also, staying in idle mode, or Light Connected or inactive state, serves a purpose of saving power consumption in such radio devices 20. For these reasons, the system may be configured to minimize messaging, while still being configured to provide a count measure of the number of radio devices 209 present within a dedicated coverage area 15. In one embodiment, this is accomplished by means of the reporting rule including a probability rule, wherein said presence message is transmitted responsive to an outcome of a probability check, based on the probability rule, indicating that the radio device shall transmit the presence message. In one embodiment, this may be done by introducing a probability factor. For example, the system may be configured such that the presence message shall be sent with a certain probability P, e.g. P=20%. Applying the probability factor P, carrying out the probability check in the step 42 of determining whether to send the presence message will only give an indication that the radio device 20 shall transmit the presence message in 20% of the cases. In one embodiment, the probability check may be carried out in each radio device 20 within the coverage area 15, responsive to the step 40 of detecting an event. For the sake of clarity, it should be noted that 20% is just an example, and that the probability factor may be both smaller and bigger. Should the network 10, or the specific base station 12, be requiring an exact number, the probability factor may be set to 100%. If an estimate is sufficient, P may be set to lower than 100%. The count measure to be compiled may be calculated, involving dividing the number of responses by the probability factor P. As an example, if probability is set to 20% and 100 radio devices 20 transmit a presence message indicating presence in the coverage area 15, then the network can estimate that there are 500 radio devices 20 in the cell, where the other 400 did not pass probability check. The estimated value represents the count measure for the radio devices 20 in the coverage area 15 that are configured to answer, e.g. the idle devices or those in Light Connected or inactive state. The lower the probability factor is, the better for power consumption in the radio device 20, while at the same time reducing amount of resource usage to perform the update.

In one embodiment, a probability factor, or at least a default value for the probability factor, may be preconfigured by specification, or for the radio network 10 in question. A certain radio device 20, or type of radio device 20, may be specified or preconfigured to always apply a certain probability factor. In an alternative embodiment, there may be a preconfigured probability factor used as a default value, unless another value is set from the network 10. In one embodiment, the network may be configured to send probability level data to the radio devices 20, for use in the radio devices 20 in said probability check. This may e.g. be carried out by broadcasting the probability level data as system information from the network. The probability level data may be a numeric value to apply, or an indication which may be mapped to a numeric value by means of a processing device in a receiving radio device 20.

A detectable event 40 that will cause the radio devices 20 to determine 42 to send a presence message may be time related, and may a period of a number of e.g. subframes or seconds. The time-dependent requirement may be preconfigured, or a default value in the radio network 10. In on embodiment, time-dependent requirement may be altered and conveyed to the radio devices 20 by e.g. as system information in a radio broadcast from the base station 12.

Another embodiment of a detectable event 40 that will cause the radio devices 20 determine 42 to send a presence message may be a trigger signal received from the network 10, e.g. from the base station 12. This may be transmitted to the radio devices 20 by broadcast of system information, and the radio devices 20 may be triggered to detect such information by paging.

In one embodiment, the reporting rule may involve messaging dependent on type or class of radio device 20. As an example, a first type or class of radio device 20 may be capable of broadband data transfer, such as an LTE radio device 20, whereas a second type or class of radio device has a more limited capability, or is restricted to lower bandwidth, such as an NB-IoT radio device 20 or an MTC radio device 20. The network 10 may e.g. need or desire information on the number of radio devices 20 with high bandwidth capability only, or only those of lower bandwidth capability, and only such radio devices 20 may be preconfigured or triggered to transmit a presence message to the network 10. In a variant of this embodiment, a certain type or class of radio device 20 may have higher priority, to access or to high bandwidth, in the coverage area 15, such as radio devices 20 associated with emergency services.

Figure 2:
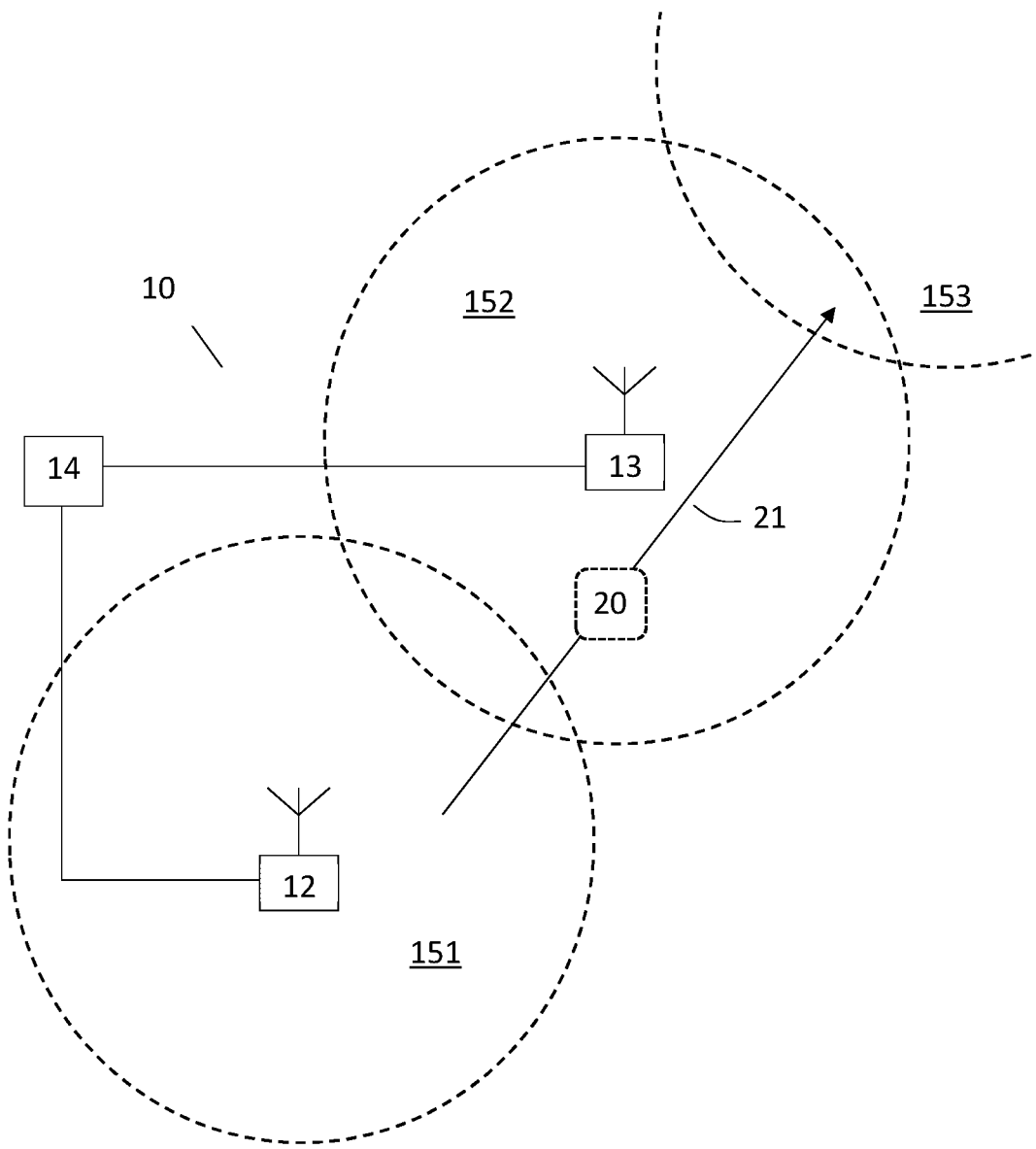
FIG. 2 schematically illustrates a radio device relocating from a first coverage area to a second coverage area of a radio network.

FIG. 2 illustrates radio network 10 and two different coverage areas 151, 152 of that network. A radio device 20 in a non-connected mode, such as in idle mode, Light Connected or inactive state, is moving from the coverage area 151 served by a first base station 12 into a second coverage area 152 served by a second base station 13. Upon detecting 40, in the radio device 20, that the radio device 20 has moved to a position where a new base station 13 is the most appropriate, e.g. by monitoring the signal strength of base stations 12 and 13, this may in an embodiment cause the determination 42 that the radio device shall transmit a presence message based on a reporting rule. As mentioned before, the coverage areas 151, 152 may represent different RAN areas, each including several cells. In another embodiment, each coverage area may be a cell, in which the relocation of the radio device 20 from the first cell 151 to the second cell 152 may be denoted a cell reselection.

In one embodiment, a reporting rule may be that for any radio device 20 entering the coverage area 152, a presence message shall be transmitted to indicate presence of the radio device 20. This may be used as a one-time transmission, which need not require any update until the radio device 20 leaves the coverage area 152. The requirement to send the presence message may be dependent on rules related specifically to the new coverage area 152, which did not apply in the former coverage area 151. In other words, not all coverage areas must apply a reporting rule for indicating presence, or the same reporting rule. The radio device 20 may receive information via system information from a base station 12 of the previous coverage area 151, that messaging to indicate presence is needed when reselection to a specific different coverage area, e.g. 152. This information may potentially also be preconfigured, or configured via dedicated signaling, e.g. in relation to neighbor cell measurement configuration. If the radio device 20 has not received any information before entering the new coverage area 152, the radio device 20 may retrieve such indication from System Information from a serving base station in the new coverage area 152 upon changing to camp to a base station 13 of the new coverage area 152. Alternatively, if there is a sudden need to count the radio devices 20 currently camping in the new coverage area 152, the radio devices 20 in such a cell or area 152 could be paged, and then all the responses could be counted.

In various embodiments, consideration may be taken to further minimize unnecessary signaling. This may be relevant for situations where it can be assessed that the radio device 20 is passing through the coverage area 152 rather than moving to stay in it. In FIG. 2, this is illustrated by the continuation of the arrow indication the movement of the radio device 20, further to a third coverage area 153, e.g. a new cell 153.

In one embodiment, the reporting rule may include considering a parameter indication that messaging shall not be done as soon as the change of coverage area, e.g. cell reselection has taken place. The reporting rule may include an indication of a delay to apply prior to transmitting the presence message from the radio device 20, counted after a certain point in time when change of coverage area, e.g. cell reselection, has been accomplished. In a variant of this embodiment, the reporting rule may include an indication of a time window, within which window the radio device may randomly calculate the delay to apply. Any of these indications may be preconfigured, or be shared from the network 10 in broadcast system information, either through the preceding serving base station 12 or the new base station 13. If, after the applied delay, the radio device has again made a cell reselection, e.g. to cell 153, transmission of the presence message may be inhibited.

In another embodiment, the reporting rule may involve the radio device 20 taking stored mobility information into considerations. The reporting rule may involve an indication to transmit a presence message provided a mobility level is below a predetermined value, and not to send if the mobility value is above said level. The mobility value may reflect e.g. number of cell reselections in a preceding time period.

In one embodiment, transmitting 44 the presence message indicating presence of a radio device 20 in a coverage area 152 may be carried out by a base station 12 of the preceding coverage area 151, e.g. via the network backbone 14. In such an embodiment, the leaving radio device 20 may update the base station 12 of the present coverage area 151 that a cell reselection to another coverage area 152 is made. This may e.g. be relevant in an embodiment where the first coverage area 151 applies a reporting rule for idle or otherwise non-active radio devices 20 to indicate their presence, but not the coverage area 152 to which it is moving.

If a radio device 20 moves between coverage areas 151 and 152 which both apply a reporting rule requesting the radio device to indicate its presence, a presence message transmitted from the radio device 20 to the base station 13 of the new coverage area 152 may trigger an update signal from the new base station 13 to the previous serving base station 12 via the backbone 14 that the radio device 20 has left. In such an embodiment, signaling may be reduced to one presence message from the radio device 20 to update the network 10 on the situation in both coverage areas 125, 125.

In various embodiments, the radio device 20 may, in its presence message to the network 10, include information related to presence in a previous coverage area 151, or related to a previously transmitted presence message. The reporting rule may include that, where a radio device 20 makes a cell reselection to a coverage area 152 where presence detection is applied by the network 10 through a serving base station 13, the radio device 20 shall include in its presence message, or in separate information associated with the presence message, an indication of a previous coverage area 151. As an alternative, this indication may specify the latest coverage area in which a preceding presence message was transmitted by that radio device 20. The latest coverage area in which a presence message was transmitted need not be the last coverage area from which the cell reselection was made, since that last coverage need not apply presence detection. The network 10 may then signal, through the backbone 14, to the base station of that previous or latest coverage area, that the radio device 20 has left.

In various embodiments, the reporting rule applied to determine whether to transmit a presence message to indicate presence of the radio device 20 within a coverage area 15 may involve both considering a probability rule, and indication of entering a new coverage area, as outlined for the embodiments above, which may thus be combined. One variant of such an embodiment may involve the radio device 20 determining to transmit the presence message responsive to the radio device making a cell reselection. A delay or mobility information determination may be made, prior to making this determination. In addition, a probability check may be made, based on a probability factor P, whether the presence message shall be transmitted. This way, not all radio devices 20 will transmit a presence message to the network after cell reselection, or in other words, not every time a radio device 20 makes a cell reselection will it be determined that it shall in fact send a presence message. In an embodiment where a radio device 20 is configured to send a presence message indicating its presence in a coverage area 151 based on a probability check, and also to update the network 10 when it is leaving a coverage area 151 upon a cell reselection (either by signaling in the area 151 it is leaving or in the new area 152), the reporting rule may involve an instruction for the radio device 20 to send a presence message indicating that it is leaving a coverage area 151 only if a presence message indicating its presence was transmitted in that area 151 as an outcome of the probability check.

In one embodiment, the presence message indicating presence of a radio device in a coverage area 15 is conveyed to the network in a radio signal received from the radio device 20. The presence message is preferably transmitted prior to, or even without, transmitting a connection setup presence message from the radio device. The radio device 20 may e.g. transmit the presence message on a random access channel RACH to the base station 12 or 13. For a radio device that is idle or otherwise non-active, the presence message would serve the purpose of indicating its presence, but not as a real access request. In one embodiment, related to LTE provided as an example for the sake of clarity, an uplink signal may be transmitted from the radio device 20 including a RACH RA Preamble, potentially after contention resolution if required, where the RACH RA Preamble may be selected based on sensed system information blocks signaled by the base station 12. This uplink signal may include, or alternatively be followed by a separate signal, indicating that this is a presence message to indicate presence and not a request for resources. The presence message may in such an embodiment be in the form of a simple flag or other indication, such as a known preamble sequence, a code or a value in one or more predefined bits in a dedicated field, which may be decoded or read by the base station 12. Responsive to retrieving this presence message from the radio device 20, rather than responding with assigned resources via PDCCH, the base station 12 may interpret the presence message received, and simply return with an Ack, or even terminate the procedure with no further signaling, thereby terminating connection setup. No further RRC signaling need thereafter follow.

In various embodiments, a radio device 20 may be configured to transmit information related to its presence in a previous coverage area 151, or related to a previously transmitted presence message, as outlined above. The reporting rule may thus include that, where a radio device 20 makes a cell reselection to a coverage area 152 where presence detection is applied by the network 10 through a serving base station 13, the radio device 20 shall include in its presence message, or in separate information associated with the presence message, an indication of a previous coverage area 151. As an alternative, this indication may specify the latest coverage area in which a preceding presence message was transmitted by that radio device 20. The indication related to a previous cell may be in the form of a flag or other indication, such as a known preamble sequence, a code or a value in one or more predefined bits in a dedicated field, which may be decoded or read by the base station 12. This indication may form part of the presence message as such, or be a separate message.

Figure 5:
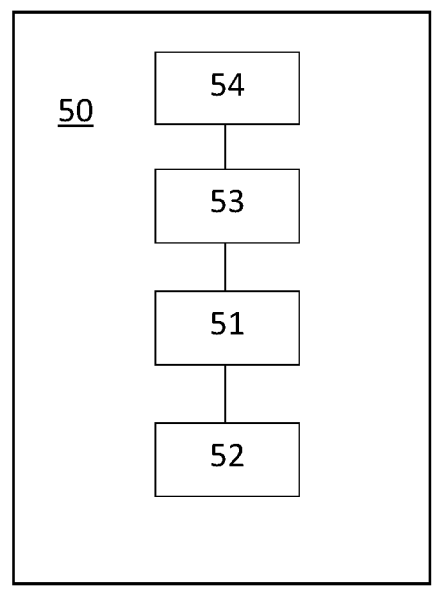
FIG. 5 schematically illustrates a radio station devised to carry out method steps as outlined for the different embodiments described herein.

FIG. 5 schematically illustrates an embodiment of a radio station 50, which is configured to operate according to the methods described herein. The radio station 50 comprises a processing system 51, connected to a memory 52 for holding data and computer program code executable by the processing system 51. A radio transceiver 53 is connected to the processing system, and to an antenna 54 for transmitting and receiving radio signals.

In one embodiment, the radio station 50 is a radio device 20, configured to communicate with a base station 12 of a radio network 10 is connected. The radio device 20 may obviously include further elements which are not shown, such as a battery, and auxiliary members such as a user interface. Upon execution of code present in memory 52, the processing system 51 may be configured to carry out any of the steps outlined herein as carried out by the radio device 20.

In another embodiment, the radio station 50 is a base station 12 of a radio network 10, configured to communicate with a radio device 20. The base station 12 may also include further elements which are not shown, such as a power supply. Upon execution of code present in memory 52, the processing system 51 may be configured to carry out any of the steps outlined herein as carried out by the base station 12, including communicating with other base stations 13.

Various embodiments have been described herein by way of examples, setting out numerous ways of realizing ways of putting the invention into practice, which invention is limited only by the appended claims.

The invention claimed is:

1. Method for establishing a count measure of radio devices in a radio network, comprising
receiving a presence message at a first base station of the radio network, wherein said presence message is transmitted from a radio device in a non-connected mode based on a predefined reporting rule that includes an instruction to transmit the presence message from the radio device responsive to the radio device entering a dedicated coverage area, and wherein said reporting rule includes an indication of a delay to apply prior to transmitting the presence message from the radio device;
detecting presence of the radio device within a-said dedicated coverage area of the radio network responsive to receiving said presence message; and
compiling the count measure, comprising calculating an estimate of the number of radio devices present, wherein the detected presence of said radio device in the non-connected mode represents a count of at least one radio device.

2. The method of claim 1, wherein said presence message is received responsive to conditional transmission of the presence message, based on an outcome of a probability check according to a probability rule, said outcome indicating whether the radio device shall transmit the presence message.

3. The method of claim 2, comprising
sending probability level data from the network, for use in the radio device in said probability check.

4. The method of claim 3, wherein said probability level data is broadcast as system information from the network.

5. The method of claim 1, wherein said reporting rule includes an indication of a time window, within which to randomly calculate the delay.

6. The method of claim 1, wherein said presence message is received prior to or without receiving a connection setup request message from the radio device.

7. A method for establishing a count measure of radio devices in a radio network, comprising
receiving a presence message at a first base station of the radio network, wherein said presence message is transmitted based on a predefined reporting rule;
detecting presence of a radio device within a first cell served by said first base station responsive to receiving said presence message; and
compiling the count measure, comprising calculating an estimate of the number of radio devices present, wherein the detected presence of said radio device represents a count of at least one radio device,
wherein the presence message is received responsive to the radio device making a cell reselection to the first cell.

8. The method of claim 7, wherein the presence message is received from a previous base station serving a previous cell, responsive to the radio device making a cell reselection to the first cell from the previous cell.

9. The method of claim 7, comprising the step of
receiving, in association with the presence message, an indication of a previous cell from which the radio device made the cell reselection.

10. Method for providing a count indication of radio devices to a radio network, comprising
transmitting a presence message to a first base station of the radio network based on a predefined reporting rule, which presence message indicates presence of a radio device in a non-connected mode within a first cell served by the first base station, wherein a count measure comprising an estimate of a number of radio devices present is compiled based at least partially on the presence message, and the presence message represents a count of at least one radio device, wherein the presence message is transmitted responsive to the radio device making a cell reselection to the first cell.

11. The method of claim 10, wherein said reporting rule includes a probability rule, wherein said presence message is transmitted from the radio device responsive to an outcome of a probability check, based on the probability rule, indicating that the radio device shall transmit the presence message.

12. The method of claim 11, comprising
receiving probability level data from the network in the radio device for use in said probability check.

13. The method of claim 12, wherein said probability level data is received as system information broadcast from the network.

14. The method of claim 10, comprising the step of
transmitting the presence message from the radio device responsive to the radio device entering said coverage area, based on a transmit instruction of said reporting rule.

15. The method of claim 14, comprising the step of
applying a delay to prior to transmitting the presence message;
randomly calculating said delay within a time window according to said reporting rule.

16. The method of claim 10, wherein said presence message is transmitted prior to or without transmitting a connection setup request message from the radio device.

17. The method of claim 7, wherein said presence message is received responsive to conditional transmission of the presence message, based on an outcome of a probability check according to a probability rule, said outcome indicating whether the radio device shall transmit the presence message.

18. The method of claim 17, further comprising:
sending probability level data from the radio network, for use in the radio device in said probability check.

19. The method of claim 18, wherein said probability level data is broadcast as system information from the radio network.

20. The method of claim 7, wherein the predefined reporting rule includes an instruction to transmit the presence message from the radio device responsive to the radio device entering a coverage area.

* * * * *